No. 719,310. PATENTED JAN. 27, 1903.
E. DEBES.
BALL AND SOCKET JOINT FOR DOLLS, &c.
APPLICATION FILED MAY 23, 1902.
NO MODEL.
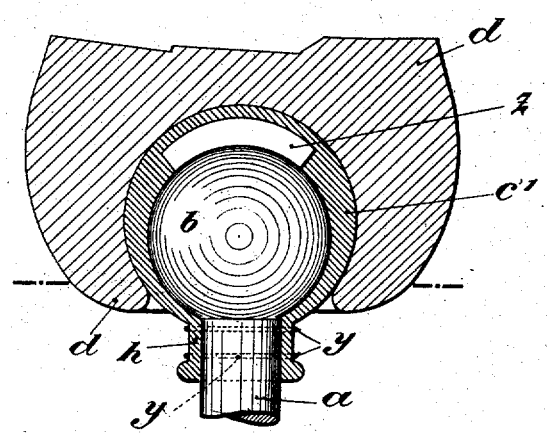
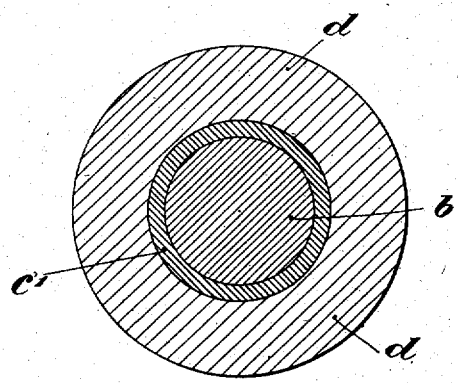
Witnesses:
Dennis Sumby
N. L. Bogan
Inventor
Eduard Debes
By James L. Norris
Atty.

UNITED STATES PATENT OFFICE.

EDUARD DEBES, OF BLANKENESE, GERMANY, ASSIGNOR TO HEINRICH ECKERT, OF MUNICH, GERMANY.

BALL-AND-SOCKET JOINT FOR DOLLS, &c.

SPECIFICATION forming part of Letters Patent No. 719,310, dated January 27, 1903.

Application filed May 23, 1902. Serial No. 108,711. (No model.)

*To all whom it may concern:*

Be it known that I, EDUARD DEBES, manager, a subject of the King of Prussia, Emperor of Germany, residing at Blankenese, near Hamburg, Germany, have invented certain new and useful Improvements in Ball-and-Socket Joints for Dolls and the Like, of which the following is a specification.

This invention relates to improvements in ball-and-socket joints for dolls and the like.

The invention aims to construct a ball-and-socket joint in such a manner as to create a friction between the two articulated parts, which while permitting ready movement of the parts will nevertheless suffice to retain the articulations in any given position.

The invention further aims to provide a ball-and-socket joint with an elastic intermediate substance between the articulations, so that any interstices which may arise through shrinkage or otherwise of the articulated parts is immediately compensated for, thus insuring permanently good action of the joint.

The invention further aims to provide a ball-and-socket joint for dolls or the like, so as to economize the elastic material interposed between the parts forming the joints as far as possible and to facilitate the ready insertion and removal at any time of the ball part of the articulation into or from the spherical socket forming the other part of the articulation.

In describing the invention in detail reference is had to the accompanying drawings, in which—

Figures 1 and 2 denote, respectively, a vertical and a horizontal section of the joint.

Referring to the drawings by reference characters, $a$ denotes the shank or connection of one of the articulations or one of the members forming the joint and which is connected to the ball $b$. The ball or sphere $b$ is provided with a projection $z$. The ball or sphere may be provided with more than one projection $z$; but only one is shown.

The reference character $c'$ denotes the intermediate socket formed of elastic material, preferably of india-rubber, and is adapted to be inserted in the socket $d$ of the other articulation or member of the joint. The ball or sphere $b$, with the projection $z$, is adapted to be inserted into the intermediate socket $c'$. The purpose of the projection $z$ is to insure that the ball part $b$, with the intermediate socket $c'$, may move more securely in the socket $d$ and also to economize the elastic material in the case of larger articulations, and thus economy may be still further increased by making the intermediate socket $c'$ perforated.

The intermediate socket $c'$ is provided with a neck $h$, fixed on the shank $a$. This neck is secured by a wire fastening or the like $y$.

Having thus fully described my invention, what I claim as new, and desire to secure by Letters Patent, is—

1. In a ball-and-socket joint, a member provided with a socket, means extending in said socket and forming an intermediate socket, and a member comprising in its construction a ball and a projection, said ball and projection adapted to be inserted in said intermediate socket.

2. In a ball-and-socket joint, a member provided with a socket, elastic material arranged in said socket and forming an intermediate socket, and a member provided with a projection adapted to engage in the said intermediate socket.

3. In a ball-and-socket joint, a member provided with a socket, a member extending in said socket and provided with a projection, and elastic material adapted to embrace the member extending in said socket.

In testimony whereof I have hereunto set my hand in presence of two subscribing witnesses.

EDUARD DEBES.

Witnesses:
   E. H. L. MUMMENHOFF,
   OTTO W. HELLMRICH.